Nov. 27, 1951        D. E. BENCH        2,576,275
APPARATUS FOR FILTERING
Filed May 29, 1948        2 SHEETS—SHEET 1
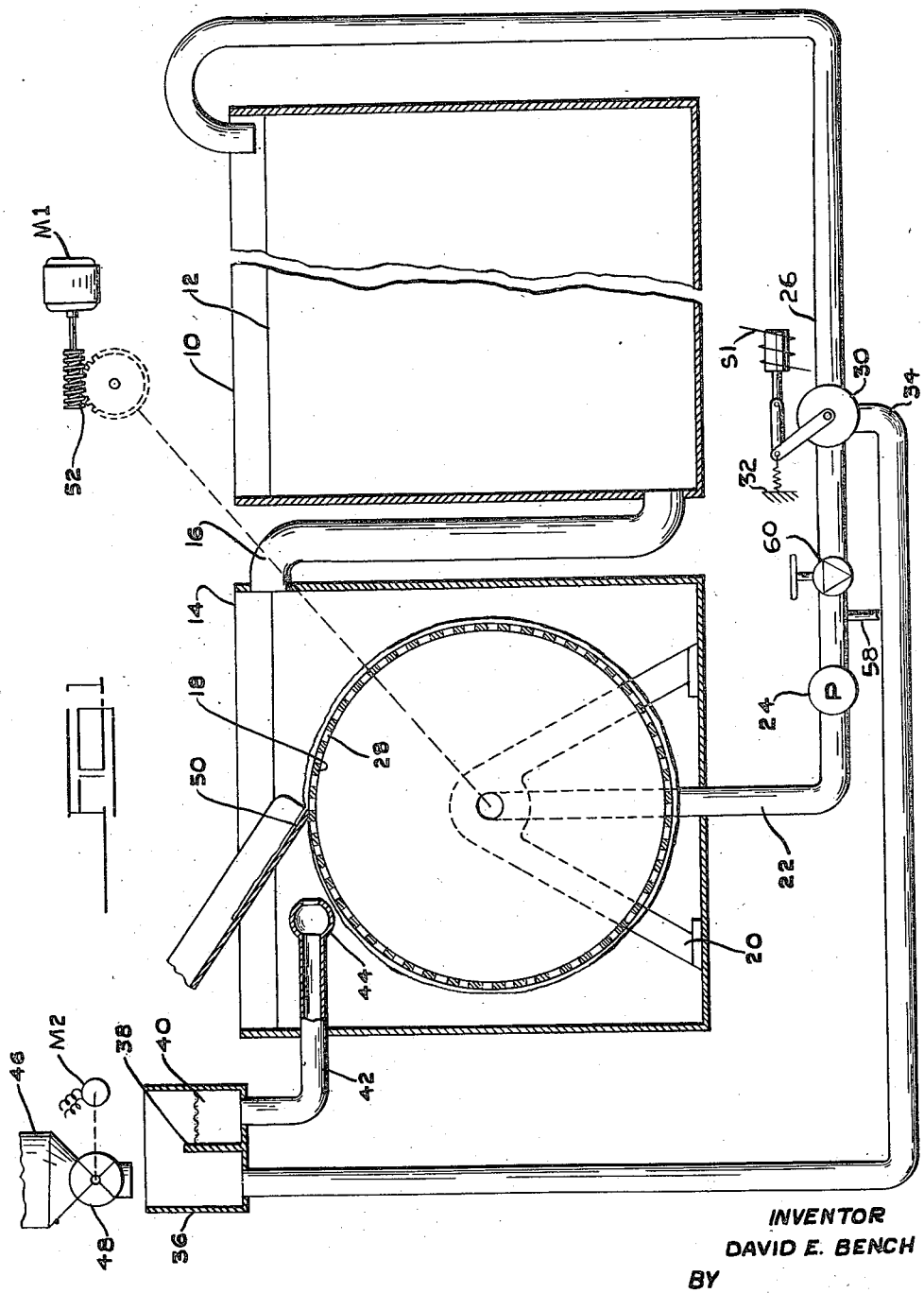
INVENTOR
DAVID E. BENCH
BY
Toulmin & Toulmin
ATTORNEYS

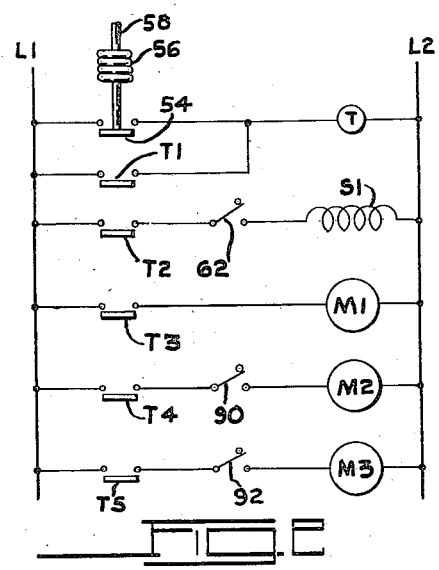
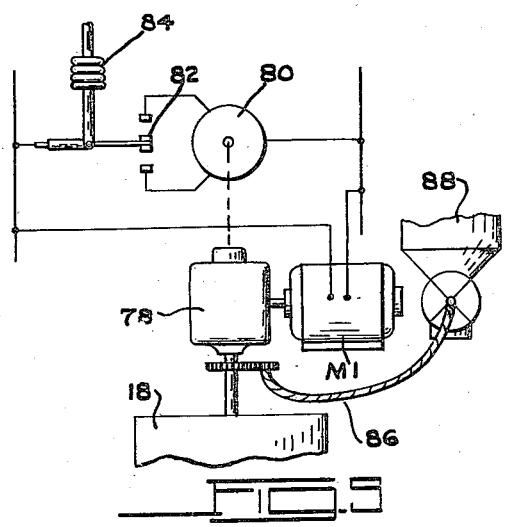
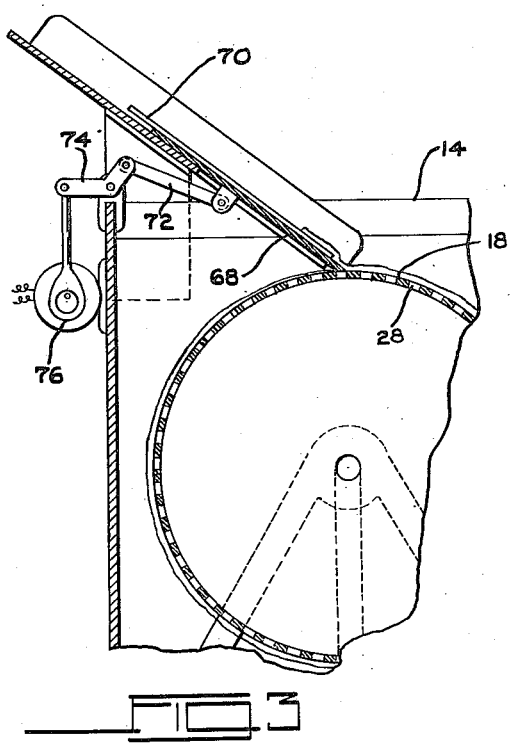
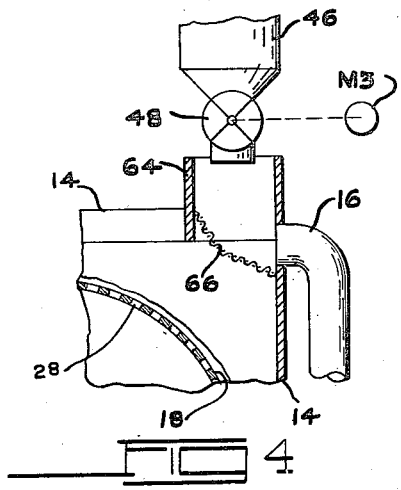

Patented Nov. 27, 1951

2,576,275

UNITED STATES PATENT OFFICE 2,576,275

APPARATUS FOR FILTERING

David E. Bench, Dayton, Ohio, assignor to The Commonwealth Engineering Company of Ohio, Dayton, Ohio, a corporation of Ohio Application May 29, 1948, Serial No. 30,060

10 Claims. (Cl. 210—199)

This invention relates to filtering devices, and in particular to continuous and automatic filters.

In the art of filtering it has long been recognized that an ideal filtering system would be substantially continuous and automatic thereby reducing to a minimum the down time of the equipment while the fluid is being filtered and also maintaining the conditions of the fluid in the equipment as nearly uniform as possible at all times.

In practice, most filtering devices are of the batch type and operate intermittently either by closing off a portion of the filtering member during the time the surface thereof is being renovated or by replacing it with another filtering member.

Both of these methods of operation are unsatisfactory, because in the first case a substantial portion of the filtering member is rendered inactive at all times, and in the second case two filtering members, usually in the form of drums, must be provided, and in addition auxiliary equipment, such as overhead cranes and the like, must be available for lifting out the used drum and inserting the new.

In the applicant's co-pending application in which he was co-inventor with Albert O. Fink, and which is identified by Serial No. 794,634, and filed December 30, 1947, there is shown a filtering system which approaches a continuous filtration process and which obviates a great many of the shortcomings found in filtering devices of the prior art.

The instant application is a further development and extension of certain inventive features of the above mentioned application, Serial No. 794,634, and has for its principal object the provision of a simple and effective filtering system which is substantially continuous in operation.

A still further object of the present invention is the provision of a filtering system which will simulate continuous operating conditions and which accomplishes this result with a relatively simple mechanism.

It is also an object of this invention to provide an improved filtering arrangement especially adapted for using fibrous filter-aid materials.

Another object of the invention is the provision of filtering apparatus of the type aforesaid in which the solution being filtered is introduced into a filtering tank and a filter aid is added to the incoming solution so as to thoroughly disperse the filter aid.

It is also an object of this invention to provide an automatic filtering device which operates continuously on automatic cycle for maintaining the fluid to be filtered in a predetermined condition.

Yet another object of the invention is the provision, in filtering apparatus of the character above noted, of a bypass arrangement which may be utilized when the solution being filtered contains dirt solids to return the solution to the filter tank but which bypass may be cut out when the solutions being handled are clean to moderately dirty.

Still another object of the invention is the provision, in filtering apparatus including a rotatable drum and scraping blade, of means for introducing filtered solution together with filter aid directly to the recoating zone under the blade. This is advantageous in that the concentration of solids is reduced and the conditions where bypassing is not required is more closely simulated. Moreover, as the concentration of dirt particles on the drum is reduced the concentration of the filter aid is increased.

These and other objects and advantages will become more apparent upon reference to the following description taken in connection with the accompanying drawings in which:

Figure 1 is a longitudinal section showing a filtering arrangement according to this invention and with the several parts of the system generally designated diagrammatically;

Figure 2 is a diagrammatic wiring diagram showing the control system for effecting the automatic control of the filtering arrangement shown in Figure 1;

Figure 3 is a fragmentary view showing a modified arrangement for the scraping blade which removes the surface coating from the filtering drum;

Figure 4 is a fragmentary view showing another arrangement for adding the fibrous filter-aid to the filter tank; and Figure 5 is a fragmentary view showing one manner of arranging the filter for continuous operation rather than intermittent operation.

Referring to the drawings, the arrangement shown therein comprises a tank at 10 having fluid 12 therein to be filtered. The tank 10 may comprise any sort of work station, such as a plating tank or other chemical process, and the liquid therein is subject to contamination by solids during the process which is carried out in the tank 10.

The filter for filtering the fluid 12 comprises a tank 14 which may be arranged adjacent the tank 10 and which is connected therewith by means of a conduit 16. The conduit 16 extends from the bottom of the tank 10 to the top of the tank 14 and operates as an overflow so that fluid can be continuously passed from the tank 10 to the tank 14. Rotatably mounted in the tank 14 is a perforated drum 18. The drum 18 has its ends closed and is rotatably mounted on bracket means as shown at 20. A suction pipe 22 opens into the interior of the drum for drawing fluid therefrom. A pump 24 in the conduit 22 draws a suction on the said drum and the fluid drawn from the drum in this manner is expelled under pressure through the conduit 26 to the tank 10. In this manner fluid is continuously circulated from the tank 10 to the tank 14, then through the drum 18 to the conduit 22, and then through the pump 24 and the conduit 26 back to the tank 10.

In connection with the drum 18, this is shown in the drawings as consisting of a cylindrical metallic member having apertures 28 therein. These apertures are shown of a substantial size in order to make them clearly apparent in the drawings, but it will be understood that the apertures actually are very small, and one preferred form of shell for the drum 18 comprises a metallic member which is formed by an electrical process and which is foraminous by virtue of a plurality of very tiny apertures therein of only a few thousandths of an inch in diameter.

Between the pump 24 and the tank 10 there is a three-way valve 30 which is normally urged by a spring 32 into position to connect the discharge side of the pump 24 with the conduit 26. Upon energization of a solenoid S1 associated with the valve 30 the said valve is shifted to connect the pump discharge with a conduit 34 leading to a head box 36 which is located somewhat above the upper level of the fluid in the tank 14. This head box may have a partition 38 therein and a screened outlet chamber 40 which is connected by a conduit 42 with a manifold 44 extending longitudinally along the drum 18.

Positioned above the head box 36 is a hopper 46 having a rotatable measuring discharge element 48 connected with a drive motor M2. When the motor M2 is energized the measuring discharge element 48 rotates and discharges material from the hopper 46 into the head box 36.

The material in the hopper 46 is filter-aid which, as is well known in the art, coats the surface of a filtering member through which fluid is being drawn and acts to set up irregular small channels which permit the fluid being filtered to flow therethrough, but which retain the solids and gels being filtered from the fluid. In the particular example shown in the drawings the type of filter-aid is fibrous, but it will be understood that granular filter-aids, such as the diatomaceous earth, could be employed if desired.

Bearing on the top of the drum immediately forward of the manifold 44 is a scraping knife 50 which is adapted for stripping the coating of filter aid from the surface of the drum 18 as the said drum is driven in rotation. The driving of the drum may be effected by the motor M1 through the worm and wheel reduction gearing 52 as shown in Figure 1 and the direction of rotation of the drum is counterclockwise as viewed in Figure 1.

The control of the valve 30 and the operation of the filter-aid dispensing mechanism above the head box 36 and the driving of the drum 18 by the motor M1 is accomplished by the electric circuit shown diagrammatically in Figure 2. In this figure there are the power lines L1 and L2 and therebetween is connected a timer marked T which is in series with the normally closed blade 54. The blade 54 is connected with a resilient expansible member 56, such as a bellows, and which in turn is connected by a conduit 58 with the inlet side of a valve 60 in the conduit 26 as shown in Figure 1.

When the pump 24 is discharging above a predetermined rate the pressure established ahead of the valve 60 will be conveyed through the conduit 58 to the expansible bellows 56 and urge the blade 54 away from its associated contacts and thereby retain the timer T de-energized. However, when the flow rate through the pump 24 falls below the said predetermined amount, the loss in pressure ahead of the valve 60 permits the bellows 56 to collapse and the blade 54 to close on its associated contacts, thereby energizing the timer T.

As is well known in connection with filters the rate of flow therethrough is a direct indication of the need for renovating the surface of the filter, and whenever the said rate is below a predetermined amount it is desirable for a clean filtering surface to be presented to the fluid to be filtered.

The timer T has a first blade T1 which bypasses the blade 54 and acts as a holding circuit for the said timer. The timer also has a blade T2 which is in series with a selector switch 62 and the solenoid S1 associated with the valve 30. A third timer blade T3 is in series with the motor M1 and controls the driving of the drum 18, a timer blade T4 is in series with selector switch 90 and the dispensing motor M2 which controls the supply of filter-aid to the head box 36, and a fifth blade T5 is in series with a selector switch 92 and a motor M3 for a dispenser to be described presently.

In a manner well known in the timer art, energization of T will immediately close blade T1, which will thereafter remain closed until the time period has elapsed. During this predetermined period, blades T2, T3, T4, and T5 will close and open according to whatever functions are controlled by them. The operation of these last named blades will become apparent from the following description of the operation of the filter.

Operation

In outlining the operation of the above described arrangement attention is first called to the face that the apparatus is adapted to be used on solutions which are contaminated to varying degrees. Thus the solution might be clean to moderately dirty under which circumstances the arrangement of Figure 4 would be used in which the bypass 34 is eliminated. On the other hand the solution might contain dirt solids in which case the bypass 34 is employed. The latter arrangement is now described as follows:

Let it be assumed that the drum 18 is covered with a filter aid material and that the pump 24 is running and drawing fluid from the drum 18 and returning it through the conduit 26 to the tank 10. The control circuit of Figure 2 is prepared by closing selector switches 62 and 90 and opening selector switch 92.

Let it now be assumed that the residue filtered from the fluid so restricts the fluid flow through the drum that the pressure ahead of the valve 60 drops to the point where the blade 54 closes on its contacts. This will energize the timer T, whereupon the blade T1 thereof is closed to establish a holding circuit, and to energize the solenoid S1 which will maintain the timer energized for a predetermined period. Energization of the timer also closes T2, which shifts the valve 30 to divert the pump discharge through the conduit 34 and head box 36 back to the filtering tank.

This closed circulation of the fluid through the filtering tank and drum continues, and after a predetermined time substantially all of the foreign material in the fluid is filtered therefrom. Thereafter, and with the said circulation of fluid continuing the blade T3 closes and energizes the motor M1 and commences the drum 18 to rotating counterclockwise so that the scraper blade 50 commences to scrape the surface coating therefrom.

This operation may continue until the entire surface of the drum is completely clean. Preferably the pump 24 is maintained in operation during this time in order to prevent filter aid and residue dislodged from the surface of the drum by the action of the scraper blade from falling into tank 10 and providing a source of contamination for fluid subsequently passed therethrough.

Assuming that the rotation of the drum continues until it is scraped clean, then the blade T3 will open to de-energize the motor M1 and halt rotation of the drum and the blade T4 will close to energize the motor M2 and to commence operation of the filter aid dispensing mechanism above the head box 36.

It will be noted that, since the solution is circulating through drum 18 and tank 14 via the conduits 34 and 42 and head box 36, the filter aid dispensed is introduced into a stream of the solution and, thus, dispersion of the filter aid to a high degree is assured.

As the filter-aid is so dispensed into the head box it is carried therethrough through the discharge chamber 40 and conduit 42 to the manifold 44 and expelled into the filter tank. The filter-aid will be caught on the surface of the drum and deposited relatively uniformly thereover. Uniform deposition of the filter aid on the drum obtains because the fluid carrying the filter aid always flows most rapidly through that part of the drum surface having the thinnest layer of filter cake thereon. After a predetermined amount of filter-aid has been dispensed the timer blade T4 will open and halt the dispensing of filter-aid into the head box. Due to the circulation of fluid through the head box, after a short time all of the filter-aid which has been delivered to the head box will be conveyed to the filtering tank and therein deposited on the drum 18. Thereafter the blade T1 opens to de-energize the timer, and the recoating cycle is completed. De-energization of the timer opens blade T2 thereof and permits the valve 30 to return to the position shown in Figure 1 and wherein the discharge of the pump is directed through the conduit 26 to the tank 10. At this time the entire surface of the drum 18 is coated with a perfectly clean layer of filter-aid material and therefore filters at its maximum rate. As the surface of the drum 18 gradually becomes loaded with material and the flow rate therethrough drops the foregoing cycle of operations will again take place.

It will be evident that the operations described above need not be carried out consecutively as described, but that the dispensing of filter aid material could take place concomitantly with the scraping of the drum. This, in fact, is the preferred method of operation, and it will be evident that the slurry of filter aid material and fluid discharged from the manifold 44 will coat out on the drum 18 immediately behind the scraper blade 50, because that is the portion of the drum through which fluid is flowing at the maximum rate.

It will be evident that the only thing that is necessary to adjust the system for one method of operation or the other is adjustment of the order of closing of the timer blades and the length of time that they remain closed.

In connection with the first mentioned method of operation wherein the drum is entirely cleaned and then the new filter cake built up thereon, the filter aid material may be dispensed by the arrangement shown in Figure 4 and wherein the bypass conduit 34 is entirely eliminated.

In Figure 4 the filter aid dispensing hopper 46 is located over the tank 14 immediately above the point where the conduit 16 opens into the said tank. This is in the critical region where it is desired to introduce the filter aid to avoid fouling of the screen. A small head box arrangement 64 having a screened outlet 66 is provided for insuring that the filter aid material will be properly broken up in the fluid before reaching the surface of the drum 18. The dispenser in Figure 4 is operated by a motor M3, as shown.

In the arrangement of Figure 4 it will be noted the filter aid is introduced into the stream of the incoming solution immediately the latter leaves the conduit 16. This follows the same plan hereinbefore discussed for providing for good dispersion of the filter aid.

When the arrangement shown in Figure 4 is utilized, the selector switch 62 is moved to its open position to prevent operation of the solenoid S1. The selector switch 90 is moved to its open position to prevent operation of the dispensing motor M2, and the selector switch 92 is moved to its closed position so that upon operation of the timer blade T5, the dispenser motor M3 will operate.

When it is desired to renovate the filter cake on the drum in the arrangement shown in Figure 4, it is merely necessary to set the drum to rotating and simultaneously to dispense filter-aid material into the head box 64 by energizing the motor M3. The direction of rotation of the drum is, as before, counterclockwise. After the drum has made one revolution, rotation thereof is halted, while operation of the dispenser may continue for a short period of time if desired.

Due to the fact that the highest rate of fluid flow through the drum will take place over the portion thereof having the thinnest filter cake, the foregoing described method of supplying cake forming material to the surface of the drum will result in a relatively uniform deposit of filter cake having good filtering characteristics. Optionally, the Figure 4 arrangement may be operated so that one complete revolution of the drum takes place before action of the dispenser is initiated. The exact manner of operating the arrangement shown in Figure 4, or any of the other arrangements, will depend on the particular nature of the filtering cycle being carried out and whether or not the requirements are sufficiently rigid to require batch type operation or continuous operation.

A feature common to all of the methods of operation described above resides in the arrangement for dispersing the cake forming filter aid material into the stream of fluid flowing toward the filtering drum. In practice it has been found that the material can be thrown into the filtering tank loosely and at random, and it will still find its way to the surface of the drum and coat it uniformly, due to the fluid flow from the tank into the drum. However, in order to avoid any concentration of dirt on the surface of the drum which might clog the fine openings therein, it is preferred to introduce the cake forming material into the stream of fluid entering the filtering tank, whereby the dirt in the fluid is admixed with and entrained in the filter aid and is, therefore, removed from the drum whenever the filter cake is scraped therefrom.

In connection with the use of fibrous filter-aid material, it has been found desirable to bring about relative circumferential movement between the scraper blade and the peripheral surface of the filtering drum. This relative movement is oscillatory in nature and is in addition to the relative movement of the drum and blade during removal of the cake from the drum and superimposed thereon. It has been found beneficial because fibrous filter aid material includes fine filaments, the ends of which enter the holes in the periphery of the drum and tend to hold the filter cake on the drum so a simple scraping action is not sufficient completely to remove the cake. By the oscillatory or vibratory movement of the blade, as in Figure 3, a cake of fibrous material can be completely removed from the drum. One manner of accomplishing this is shown in Figure 3 wherein the scraping blade comprises a relatively thin blade 68 and which is mounted for oscillatory movement in the guide means 70. A drag link 72 connects the blade with a rocking arm 74 which is pivoted on the edge of the tank 14 and which has one end connected with a motor driven eccentric 76. In operation, the motor driving the eccentric 76 is preferably connected in parallel with the drum driving motor M1 and operates during the same period of time.

The arrangement shown in Figure 5 is one manner of obtaining continuous operation of the filter. In this figure the filter drum 18 is connected through a speed changing unit 78 with the drum driving motor M1. The gear reduction unit is connected with a ratio changing motor 80 so that in one direction of rotation of the motor 80 the unit 78 is adjusted so that the drum 18 rotates more rapidly and in its other direction the unit 78 is adjusted so that the drum 18 rotates more slowly. The direction of operation of the motor 80 is determined by the switch 82 which may be controlled by the bellows 84 which is connected similarly to the bellows 56 in Figure 2.

When the bellows expands beyond a predetermined point indicating flow above a certain rate through the filter drum, the motor 80 is adjusted to reduce the speed of the filter drum. When the bellows 84 collapses, thereby indicating a reduction in fluid flow beyond a predetermined level, the motor 80 rotates to adjust the unit 78 to increase the speed. In this manner the drum 18 is caused to rotate at the optimum speed maintaining the filtering rate therethrough at a desirable high level, but maintaining the speed of rotation at a sufficiently low level that the unit economical in its use of filter-aid material. The dispensing of filter-aid material is correlated with the speed of operation of the drum by the flexible drive 86 extending from the drum driving shaft to the filter-aid dispensing mechanism at 88.

It will be understood that this invention is susceptible to modification in order to adapt it to different usuages and conditions and, accordingly, it is desired to comprehend such modifications within this invention as may fall within the scope of the appended claims.

I claim:

1. In a filter; a tank, a drum having a perforate periphery in the tank entirely below the normal liquid level of the tank, pump means having its inlet connected with the interior of the drum, a scraper blade bearing on the surface of the drum to remove the entire thickness of the filter cake thereon upon rotation of the drum, a motor for driving said drum, means responsive to a predetermined reduced flow rate through said filter for initiating energization of said motor, and timing means for maintaining said motor energized until the drum has made at least one complete revolution.

2. In a filter; a tank, a drum having a perforate periphery in the tank entirely below the normal liquid level of the tank, pump means having its inlet connected with the interior of the drum, a scraper blade bearing on the surface of the drum to remove the entire thickness of the filter cake thereon upon rotation of the drum, dispensing means for supplying a measured amount of cake forming material to the tank externally of the drum, a motor for driving said drum, means operable in response to a predetermined reduced flow rate through said filter for energizing said motor to commence rotary movement of the drum, means for maintaining said motor energized until the drum has made at least one complete revolution, and means for actuating said dispensing means during energization of said motor.

3. In a filter having a tank, a drum having a perforate periphery in the tank entirely below the normal liquid level thereof, a scraper blade bearing on the periphery of the drum so rotation of the drum will cause removal of the entire thickness of a filter cake therefrom, a dispenser for dispensing measured charges of cake forming material to the tank externally of the drum, motor means for driving the drum and dispenser, speed varying means for said drum, means responsive to a predetermined reduced rate of flow of fluid through said filter for initiating energization of said motor means, and other means controlled by the flow through the filter for said speed varying means.

4. In a filter; a tank, a drum having a perforate periphery in the tank below the normal liquid level thereof, a pump having its inlet connected to the interior of the drum, a scraper blade bearing on the surface of the drum, a dispenser for dispensing measured charges of filter-aid to said tank externally of the drum, time controlled means responsive to a predetermined reduced flow rate from said pump to initiate rotation of said drum and to initiate operation of said dispenser in timed relation whereby said blade scrapes material from said drum surface and said dispenser discharges material thereto, and means for maintaining said drum in motion for one complete revolution after being started regardless of variations in said fluid flow.

5. In a filter; a tank, a drum having a perforate periphery in the tank entirely below the normal liquid level thereof, a scraper bearing on the surface of the drum, a pump having its inlet connected to the interior of the drum, a dispenser for dispensing measured charges of cake forming material to the influent side of the drum, driving means for driving said drum and dispenser, and time controlled means responsive to the rate of flow of fluid being filtered through said filter for operating said driving means, said last named means including means for controlling the speed of said driving means whereby the rate of rotation of the drum and the rate of dispensing by said dispenser are adjusted in accordance with the rate of said fluid flow.

6. In a filter; a tank, a drum having a perforate periphery in the tank entirely below the normal liquid level thereof, a scraper bearing on the surface of the drum, a pump having its inlet connected to the interior of the drum, a dispenser for dispensing measured charges of cake forming material to the influent side of the drum, driving means for driving said drum and dispenser, and time controlled means responsive to the rate of flow of fluid being filtered through said filter for operating said driving means in timed relation, said control means including means for controlling the speed of said driving means whereby the rate of rotation of the drum and the rate of dispensing by said dispenser are substantially inversely proportional to the rate of said fluid flow, and means for oscillating said scraper blade during rotation of said drum.

7. In a filter; a tank, a drum rotatably suspended in the tank entirely below the normal liquid level thereof and having a perforate periphery, a pump having its inlet connected with the interior of the drum, a scraper blade bearing on the periphery of the drum, a normally closed bypass line opening from the discharge side of the pump into the tank, a head box in said bypass line above the normal liquid level of the tank, a dispenser operable to dispense cake forming material to said head box, a manifold opening from said head box to a position behind the scraper blade, and control means automatically responsive to a predetermined reduced rate of flow of fluid from said pump for opening said bypass line, said means including time controlled means operable after said line is opened for causing said drum to rotate and for initiating operation of said dispenser in timed relation.

8. In a filter; a tank, a drum rotatably suspended in the tank entirely below the normal liquid level thereof and having a perforate periphery, a pump having its inlet connected with the interior of the drum, a normally closed bypass line opening from the discharge side of the pump into the tank, a head box in said bypass line above the normal liquid level of the tank, a dispenser operable to dispense cake forming material to said head box, a manifold opening from said head box to a position behind the scraper blade, means for rotating said drum and operating said dispenser, and control means automatically responsive to a predetermined reduced flow rate of fluid from said pump for opening said bypass line, rotating said drum and operating said dispenser, said control means including, time delay means whereby rotation of said drum and operation of said dispenser occurs after said line is opened, and said control means including means finally operable after a predetermined greater time delay to halt said drum and to stop operation of said dispenser and to close said bypass line.

9. In a filter having an inlet normally receiving contaminated fluid from a work station and an outlet normally discharging filtered fluid to the work station, a member between said inlet and outlet for supporting a filter cake, scraping means bearing on said member, a dispenser actuatable for dispensing cake forming material to the inlet side of said member, motor means energizable for moving said member, normally ineffective bypass means for diverting the entire discharge of said filter from the outlet thereof to the inlet for closed circulation of fluid through the filter, flow responsive means arranged to be sensitive to the discharge rate of said filter, and control means controlled by said flow responsive means and actuated thereby whenever the rate of discharge of said filter reaches a predetermined low value to make said bypass means effective, said control means including means operable a predetermined time after said bypass means becomes effective to energize said motor means and to bring about actuation of said dispenser, and after a predetermined greater time to again make said bypass ineffective.

10. In a filter; a tank, a drum therein, a suction connection to the inside of said drum, a scraper on said tank bearing on the periphery of said drum, a dispenser for dispensing cake forming material to the tank outside said drum, a first motor energizable for driving said drum whereby said scraper will remove the cake from the drum, a second motor energizable for actuating said dispenser, control means normally maintaining said motors deenergized and operable when actuated to energize said motors, and flow responsive means arranged to be sensitive to the rate of fluid flow through said filter for actuating said control means when the said rate reaches a predetermined low value, said control means including timing means for maintaining said motors energized for a predetermined period.

DAVID E. BENCH.

REFERENCES CITED

The following references are of record in the file of this patent:

UNITED STATES PATENTS

| Number | Name | Date |
| --- | --- | --- |
| 1,515,130 | Morrison | Nov. 11, 1924 |
| 1,579,171 | Zoul | Mar. 30, 1926 |
| 1,619,042 | Sauer | Mar. 1, 1927 |
| 2,020,693 | Manley et al. | Nov. 12, 1935 |
| 2,055,869 | Manning | Sept. 29, 1936 |
| 2,102,780 | Bielfeldt | Dec. 21, 1937 |
| 2,270,938 | Doescher | Jan. 27, 1942 |
| 2,300,908 | Broughton | Nov. 3, 1942 |
| 2,301,430 | Malanowski | Nov. 10, 1942 |